No. 782,786. PATENTED FEB. 14, 1905.
J. P. MAGNEY.
TROLLEY POLE CONTROLLER.
APPLICATION FILED JULY 11, 1904.
2 SHEETS—SHEET 1.
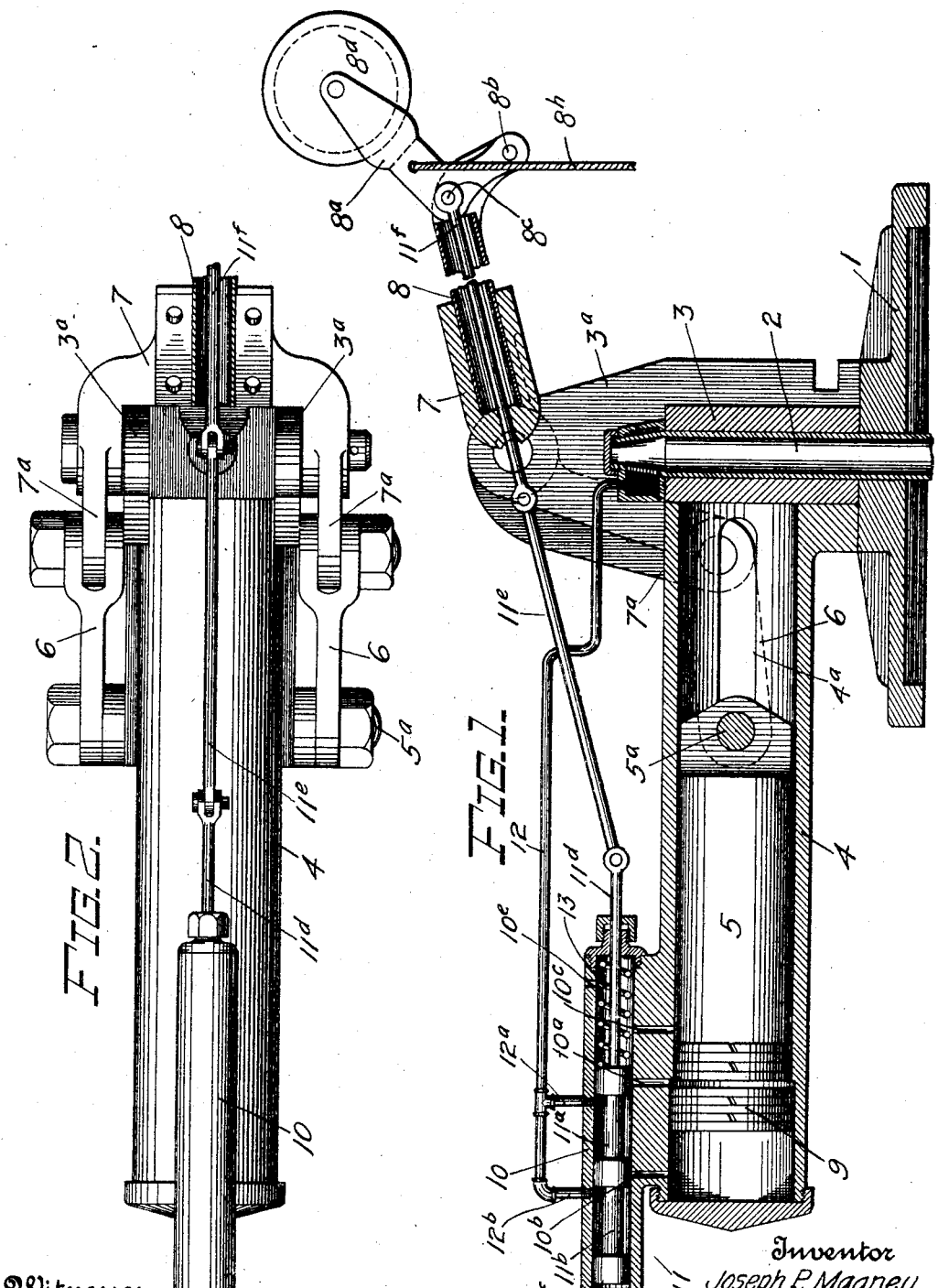
Witnesses
Inventor
Joseph P. Magney

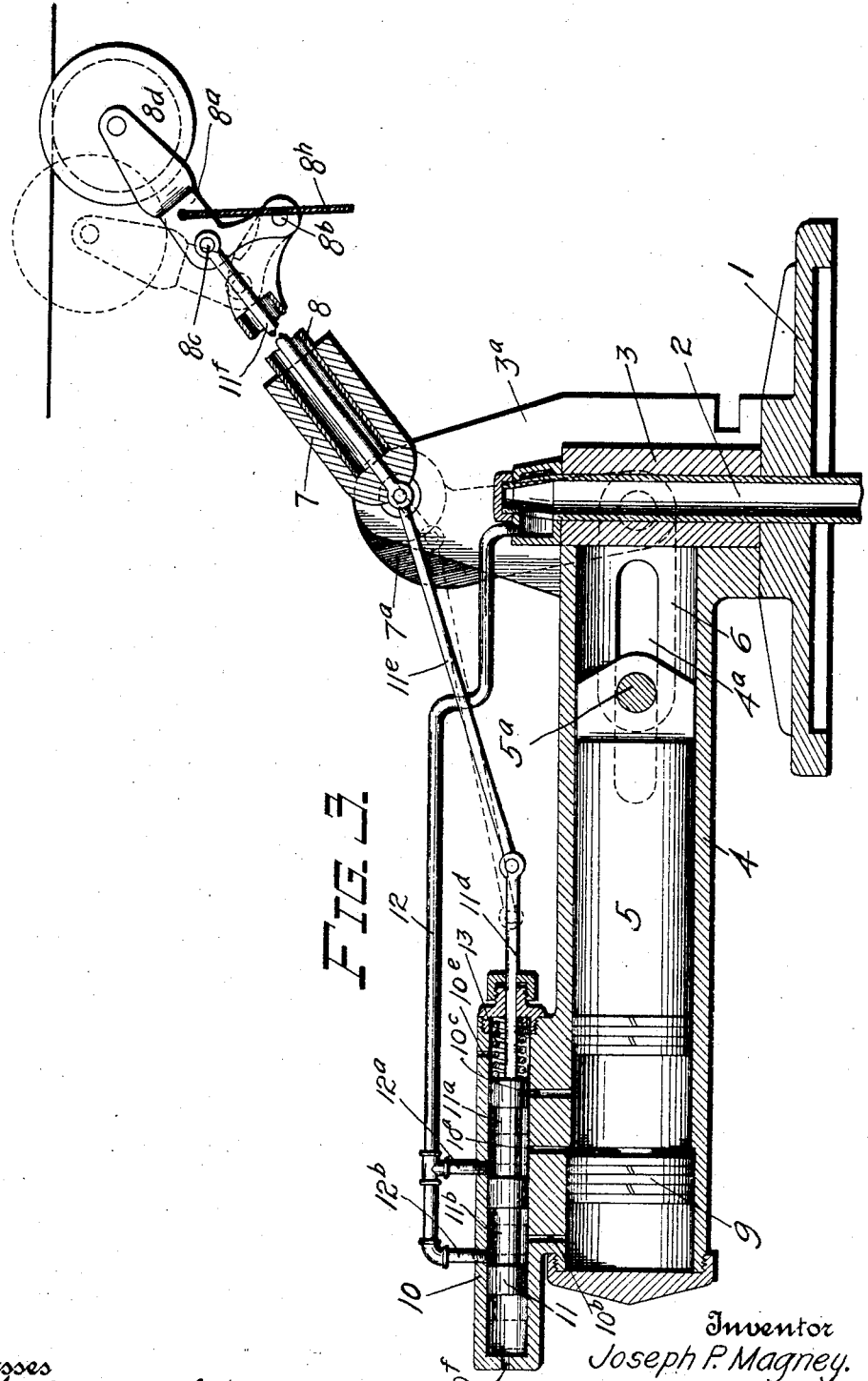

No. 782,786.　　　　　　　　　　　　　　　　　　　　　　　Patented February 14, 1905.

UNITED STATES PATENT OFFICE.

JOSEPH P. MAGNEY, OF LOS ANGELES, CALIFORNIA, ASSIGNOR TO THE MAGNEY MANUFACTURING CO., OF LOS ANGELES, CALIFORNIA.

TROLLEY-POLE CONTROLLER.

SPECIFICATION forming part of Letters Patent No. 782,786, dated February 14, 1905.

Application filed July 11, 1904. Serial No. 216,041.

*To all whom it may concern:*

Be it known that I, JOSEPH P. MAGNEY, of Los Angeles, in the county of Los Angeles and State of California, have invented certain new and useful Improvements in Trolley-Pole Controllers; and I hereby declare that the following is a full, clear, and exact description thereof, reference being had to the accompanying drawings, which form part of this specification.

This invention is an improvement in pneumatic trolley-supports; and the object of this device is to dispense with the supporting-springs commonly used at present to uphold the trolley-pole of an underrunning trolley and use a compressed-air cushion in place thereof. I provide means whereby if the trolley slips off the wire the air-cushion will be released and the trolley-pole dropped automatically, so as not to be in danger of striking the poles, brackets, or guy-wires, and also to provide means whereby the pull on the trolley-rope will automatically cause the admission of air to the cylinder and the resetting of the trolley-pole into operative position.

The invention will be clearly understood from the accompanying drawings, and the features and combination of parts constituting the invention for which protection is desired are summarized in the claims following the description of the drawings.

Figure 1 is a longitudinal sectional elevation of an underrunning-trolley stand embodying my invention, showing the trolley in full lines and the parts in the positions assumed after the trolley has escaped the wire and is lowered. Fig. 2 is a plan view of Fig. 1. Fig. 3 is a view similar to Fig. 1, showing the parts in position assumed when trolley engages the wire and in dotted lines the position assumed by the wheel when it disengages the wire.

1 designates a trolley-base, which is adapted to be secured at the top of a car and which is provided with a central hollow pin 2, which may be connected to any suitable air-supply, as the air-brake reservoir. Swiveled on this pin 2 is a sleeve 3, to which is attached a cylinder 4, which contains a reciprocating piston 5, to which is connected a pin $5^a$, which projects through slots $4^a$ in the end of the cylinder next the pin and is connected by links 6 to the bifurcated ends $7^a$ of the pole-supporting yoke 7, which is pivoted on upstanding lugs $3^a$, rising from the sleeve 3.

The pole 8, which is preferably tubular, is rigidly connected to the yoke 7, as shown in the drawings, and by reciprocating the piston horizontally the pole-support will be vibrated vertically, so as to raise and lower the harp $8^a$, which is pivoted at $8^b$ on the end of the pole and which carries the usual trolley-wheel $8^d$. So long as the piston 5 is held toward the sleeves 3 the trolley-wheel $8^d$ will be pressed upward. When the piston 5 moves away from the sleeve 3, the trolley-wheel will be lowered.

I preferably place at the outer end of cylinder 4 and outside the range of movement of the piston 5 a secondary piston 9, which is of slightly larger diameter than the piston 5, the bore of the cylinder 4 being correspondingly enlarged to accommodate it.

On top or at one side of the cylinder 4 is a valve-cylinder 10, which communicates by an inlet-port $10^a$ with the space between the pistons 5 and 9 and has another inlet-port $10^b$, which communicates with the space between the piston 9 and the end of the cylinder 4, and an outlet-port $10^c$ is arranged in advance of the inlet-port $10^a$. Within the valve-chamber is a valve 11, which is provided with cylindrical passages $11^a$ and $11^b$, which when the valve is in the position shown in Fig. 1 in full lines is adapted to establish communication between the air-supply-pipe branches $12^a$ and $12^b$ and the ports $10^a$ and $10^b$, so as to admit air into the cylinder, so as to force the pistons 9 and 5 inward toward the sleeve 3, and thus raise the trolley. The piston when the valve is retracted will close the ports $10^b$ and $10^a$, but when the valve is projected in the position shown in Fig. 1 will close the exhaust-port $10^c$ only. A spring 13 is interposed between the inner end of the valve-cylinder and the inner end of the valve, and the exhaust-port $10^c$ is adapted to communicate with this spring-chamber, and from this chamber the air can escape through a vent-opening 10$^e$. The vent-opening 10$^f$ may also be formed in the other end of the cylinder to prevent the valve 11 being forced upward by leakage of the compressed air to that end. The air-pipe 12 may be connected in any suitable manner to an air-supply. As shown, it is connected by suitable stuffing-boxes at the upper end of the hollow pipe 2, so that the compressed air can be supplied at all times to pipe 12 from pipe 2 without interfering with the rotative swing of the trolley-stand.

The valve 11 has a stem 11$^d$, which projects through the inner end of the valve-casing and is connected by a rod 11$^e$ to a tripping-rod 11$^f$, which passes through an opening in the yoke and through or inside the pole 8 and is pivotally connected at 8$^c$ to the bend of the trolley-harp 8$^a$. When the trolley-harp is turned so that the wheel is directly in line with the pole 8, the rods 11$^f$ and 11$^e$ draw the valve 11 inward toward the sleeve 3, so as to close the exhaust-port 10$^c$ and open ports 10$^a$ and 10$^b$, admitting air between the pistons 5 and 9 and between the piston 9 and the end of the cylinder. This drives the piston 5 forward and, as described, causes the elevation of the trolley pole and wheel and holds them in this position, and the periphery of the wheel 8$^d$ against the wire insures the retention of the valve in this position, as shown in full lines in Fig. 1, the spring 13 not being of sufficient power to spring the trolley-harp at an angle to the pole 8 against the pressure in the cylinder. If, however, the wheel should slip from the wire the first tendency of the air-pressure in the cylinder 4 is to move the piston 5 farther inward, and thus swing the trolley-pole farther upward; but the instant the wheel leaves the wire there is no pressure against it to prevent the spring 13 operating, and it immediately pushes the valve back, so as to uncover the exhaust-port 10$^c$ and close the inlet-ports 10$^b$ and 10$^a$, swinging the harp 8$^a$ into the position shown in dotted lines in Fig. 3, and thus allows the air to escape from the cylinder 4 behind the piston 5, and the trolley drops, as indicated in Fig. 1, the piston 5 being arrested by piston 9, which is cushioned by the air and confined between it and the end of the cylinder. The parts remain in this lower position, so that the trolley-wheel will not strike the pole or supports until the conductor pulls the harp down into alinement with the pole 8 by means of the rope attached to the trolley-harp, and in so doing draws the valve 11 forward, compressing the spring 13, closing the exit-port 10$^c$, and allowing air to again enter through the ports 10$^a$ and 10$^b$ and drive the piston 5 forward, and thus immediately raising the trolley pole and harp, so that the wheel may be again engaged with the wire, and it will remain engaged therewith under the pressure in the cylinder 4 until it again is disengaged, so that the spring 13 can throw the harp at an angle to the pole, as above described.

It is evident that the trolley-wheel may be pulled down from the wire by means of the cord 8$^h$ after releasing the cylinder, so long as it is not released sufficiently to allow spring 13 to act. It is also obvious that variations in height of the trolley-wire will not cause the release of air, as the pressure of air in the cylinder 4 will be sufficient to keep the wheel under pressure-contact with the wire in all of the allowable variations in height thereof; but only when the wheel accidentally leaves the wire and restraint is taken from the pole and from spring 13 will the air be released from the cylinder 4, so as to let the pole and wheel drop, as described.

The mode of operation of the device has been clearly set forth in the foregoing description, and further explanation thereof seems unnecessary.

I do not wish to restrict myself to the specific form and construction of parts indicated in the drawings, as it is obvious that when the invention is once known variations in its form and in the structure of the valve might be made within its scope by retaining all the essential, novel, and useful features of my invention.

Having thus described my invention, what I claim as new, and desire to secure by Letters Patent, is—

1. In a pneumatic trolley-holder, the combination of an air-cylinder, piston therein, a vibrating trolley-pole support, connections between said support and said piston, whereby the pole is elevated by the piston, a supplemental air-cushion piston in said cylinder, a valve for controlling the admission and exhaust of air to and from said cylinder, a spring for closing said valve and opening the exhaust, and connections for controlling said valve by the position of the trolley-wheel, substantially as described.

2. The combination in a trolley-stand, of an air-cylinder, a reciprocating piston therein, swinging trolley-pole, means connecting said pole with said piston, a supplemental air-cushion piston in said cylinder, a pivoted yoke attached to the end of said pole, a valve for regulating the admission and exhaust of air from the cylinder, a spring for retracting said valve, and means controlled by the harp for holding the valve in position to admit air to the cylinder.

3. In combination, an air-cylinder, a piston therein, a rocking yoke connected with said piston adapted to be operated thereby, a supplemental air-cushion piston in said cylinder, a pole connected to said yoke, a wheel carried by said pole, an air-valve on said cylinder, means for supplying air to said valve, a spring for retracting said valve, and means whereby said spring is held under compression and the valve opened while the wheel is engaged with the wire.

4. In combination, a rocking yoke, a trolley-pole connected therewith, a harp pivoted to the outer end of said pole, an air-cylinder, a piston therein, connections between said piston and yoke for rocking the latter, a supplemental air-cushion piston in said cylinder, an air-valve, connections between said air-valve and said harp, and a spring for causing said valve to release the air when the wheel accidentally disengages the wire.

5. In combination, an air-cylinder, a piston therein, a swinging trolley-pole, connections between said piston and said pole for operating the latter from the former, a supplemental air-cushion piston in said cylinder, a trolley-wheel on said pole, a valve for regulating the admission and exhaust of air to said cylinder, a spring for throwing said valve in one direction, and means controlled by the wheel for holding said spring under compression while the wheel is engaged with the trolley-wire, substantially as described.

6. In combination, an air-cylinder, a swinging trolley-supporting rod connected therewith and operated thereby, means for admitting air into said cylinder to actuate said piston, and a supplemental air-cushion piston in said cylinder, substantially as described.

7. In combination, an air-cylinder, a piston therein, a swinging yoke, connections between said yoke and piston, a supplemental air-cushion piston in said cylinder, a trolley-support attached to said yoke, a trolley-harp attached to said support, an air-valve attached to said cylinder, a spring for throwing said valve into position to open the exhaust, a connection between said valve and said harp whereby the valve is held in position to close the exhaust and keep the spring under compression while the trolley-wheel is in engagement with the wire.

8. The combination of a trolley-stand having a central air-pipe, a sleeve journaled on said air-pipe, an air-cylinder connected with said sleeve, a piston in said cylinder, a vibrating trolley-support connected with said piston, a supplemental air-cushion piston in said cylinder, an air-valve on said cylinder, and connection between the air-valve and the said pipe, substantially as described.

9. The combination of a trolley-stand, an air-cylinder swiveled thereon, a piston in said cylinder, a valve for controlling the admission of air to and from said cylinder, and means for supplying air to said valve, a spring for throwing said valve into exhaust position; with a swinging trolley-supporting yoke, connections between said yoke and piston whereby the yoke is rocked by a movement of said piston, a supplemental air-cushion piston in said cylinder, a trolley-support attached to said yoke, a wheel-harp pivoted to said support, and connections between said wheel-harp and said valve whereby the valve is held in position to close the exhaust and compress the spring while the wheel is in engagement with the trolley-wire, substantially as described.

10. The combination of the base, the horizontally-disposed cylinder swiveled thereon, the piston in said cylinder, a yoke pivotally connected with one end of the cylinder, connections between said yoke and piston whereby the latter operates the former, an air-valve chamber on said cylinder, the air-valve having a stem projecting out of said chamber, a spring for throwing said valve to release position; a pole attached to said yoke, an angular trolley-harp pivoted to said pole, a rod pivoted to the bend of said harp and extending through the yoke, and a link connecting the lower end of said rod to the valve-rod, all substantially as set forth.

In testimony that I claim the foregoing as my own I affix my signature in presence of two witnesses.

JOSEPH P. MAGNEY.

In presence of—
  W. F. THOMAS,
  D. B. WALKER.